April 24, 1956
C. O. WESTON
2,742,934
SPRING ASSEMBLY MACHINES
Filed May 10, 1951
6 Sheets—Sheet 1
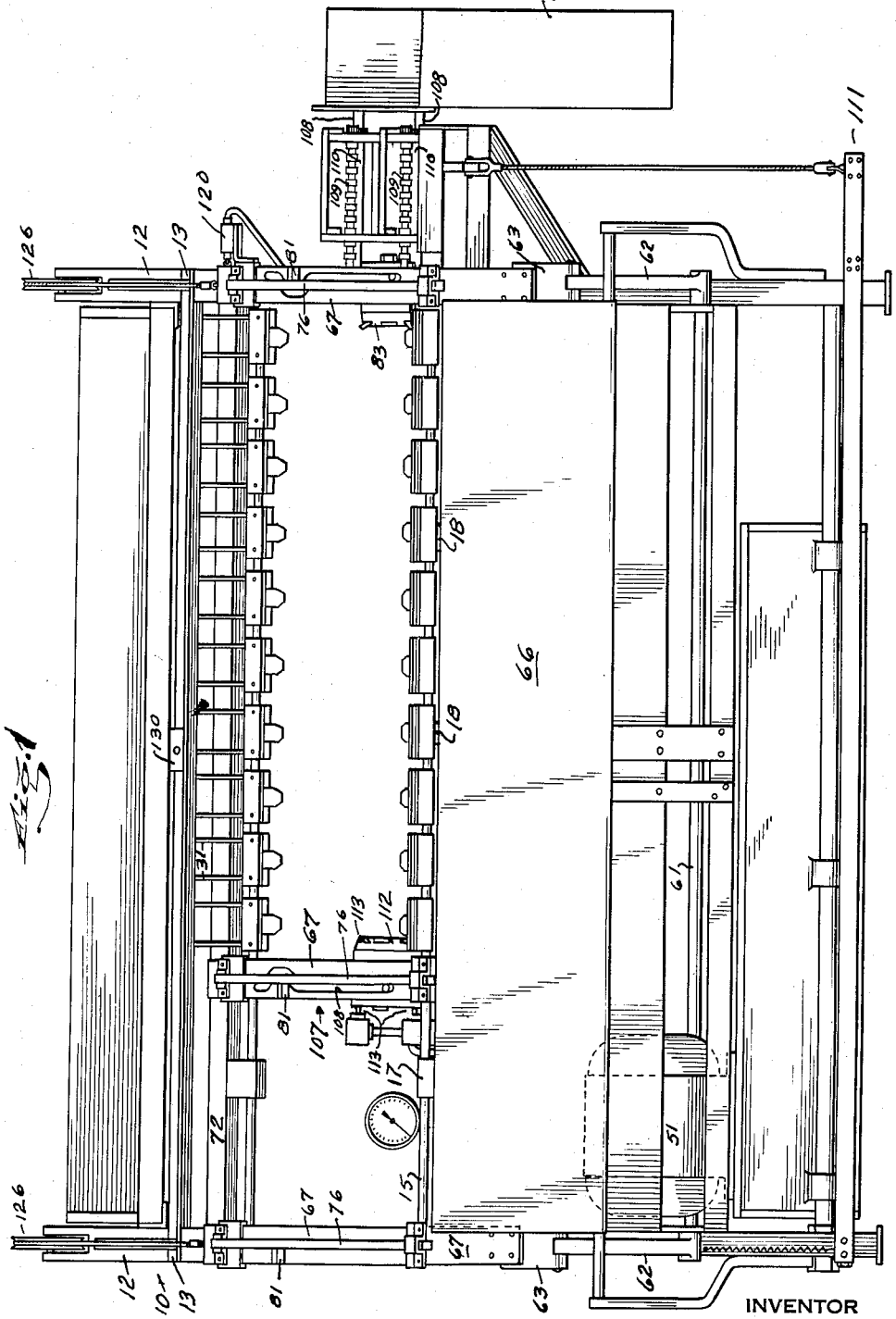
INVENTOR
CHARLES O. WESTON
BY
Frederick S. Duncan
ATTORNEY April 24, 1956
C. O. WESTON
2,742,934
SPRING ASSEMBLY MACHINES
Filed May 10, 1951
6 Sheets-Sheet 2
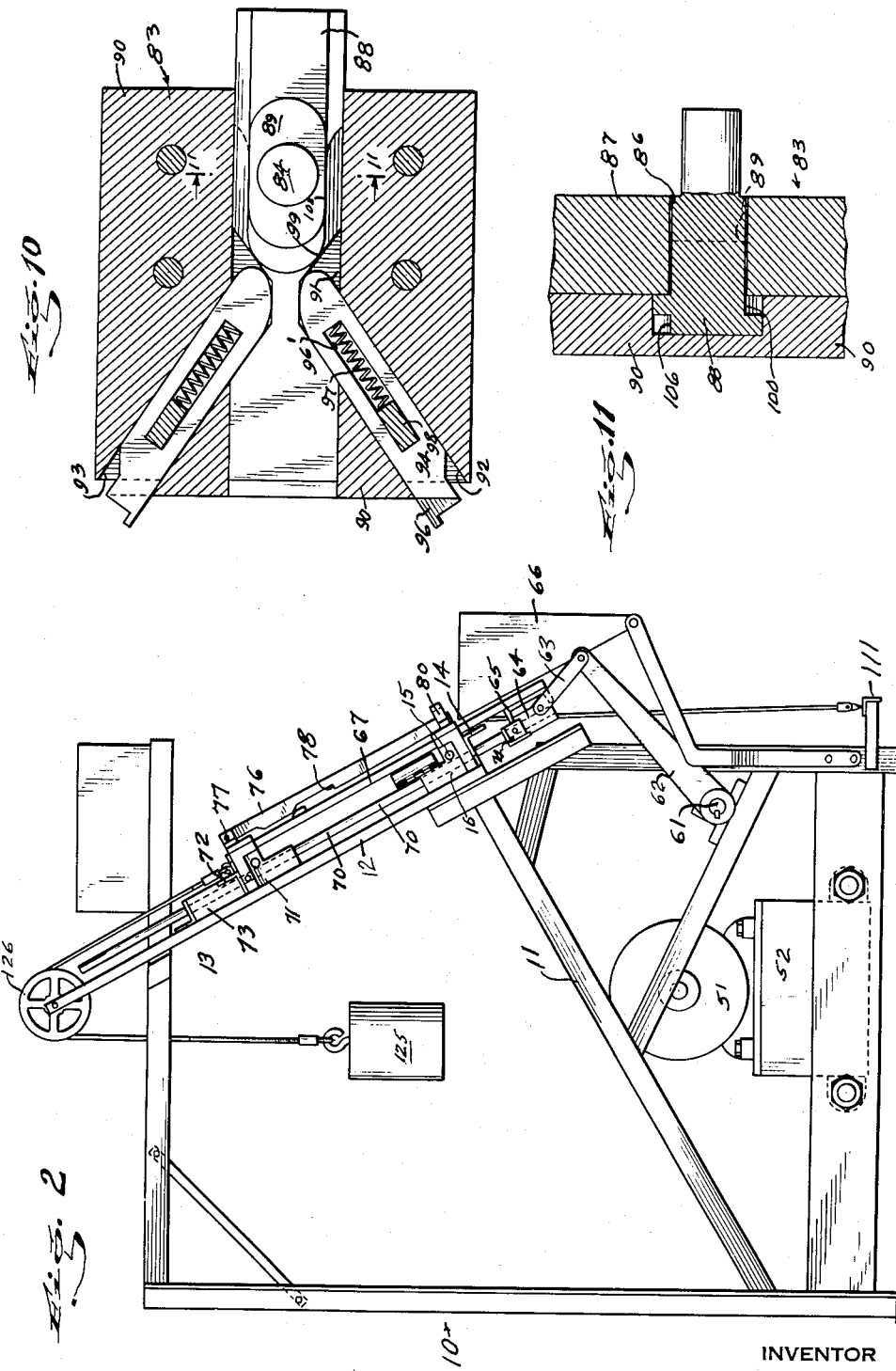
INVENTOR
CHARLES O. WESTON
BY
Frederick S. Duncan
ATTORNEY April 24, 1956
C. O. WESTON
2,742,934
SPRING ASSEMBLY MACHINES
Filed May 10, 1951
6 Sheets-Sheet 3
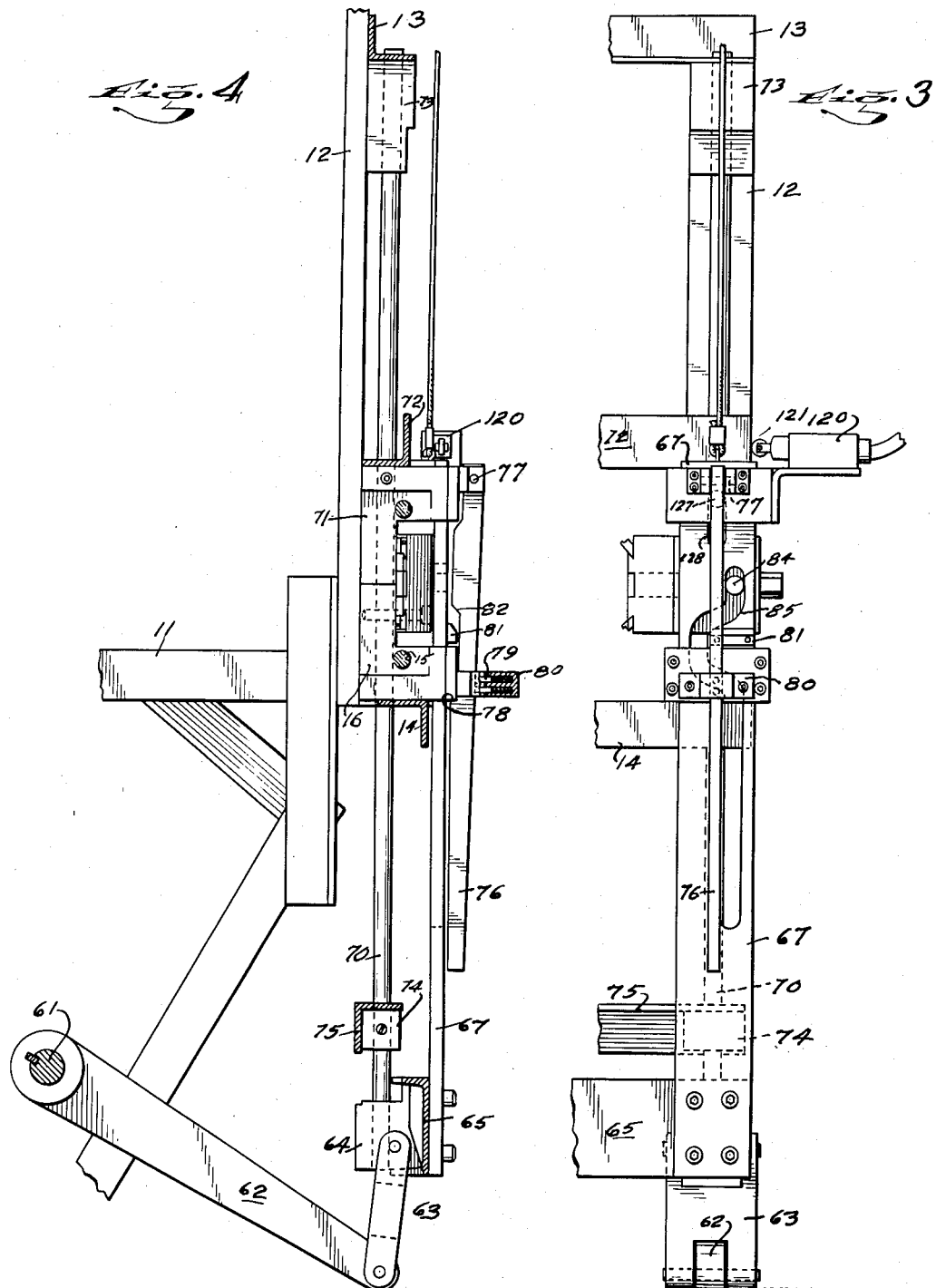
INVENTOR
CHARLES O. WESTON
BY
ATTORNEY

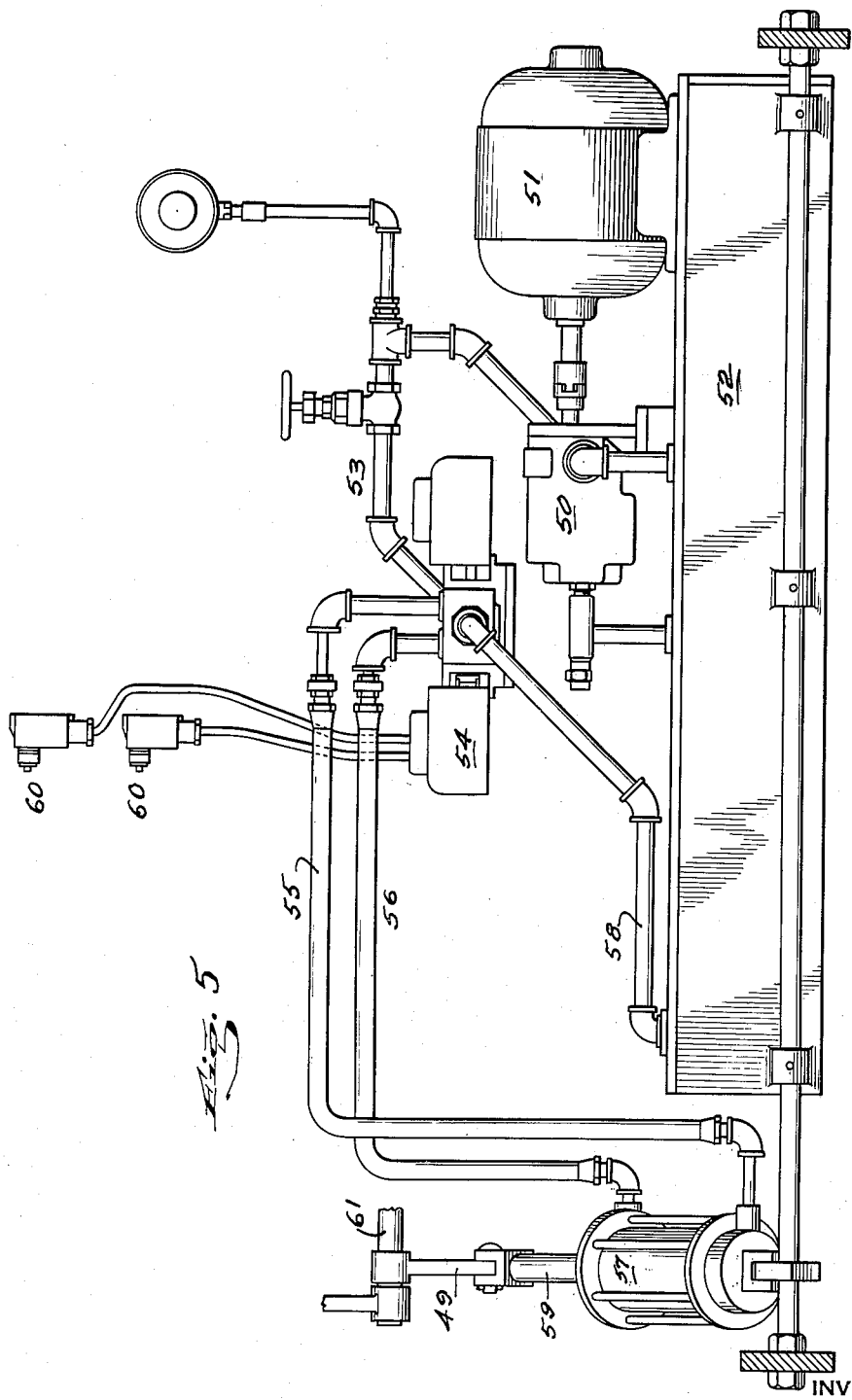

April 24, 1956  C. O. WESTON  2,742,934
SPRING ASSEMBLY MACHINES
Filed May 10, 1951  6 Sheets-Sheet 5
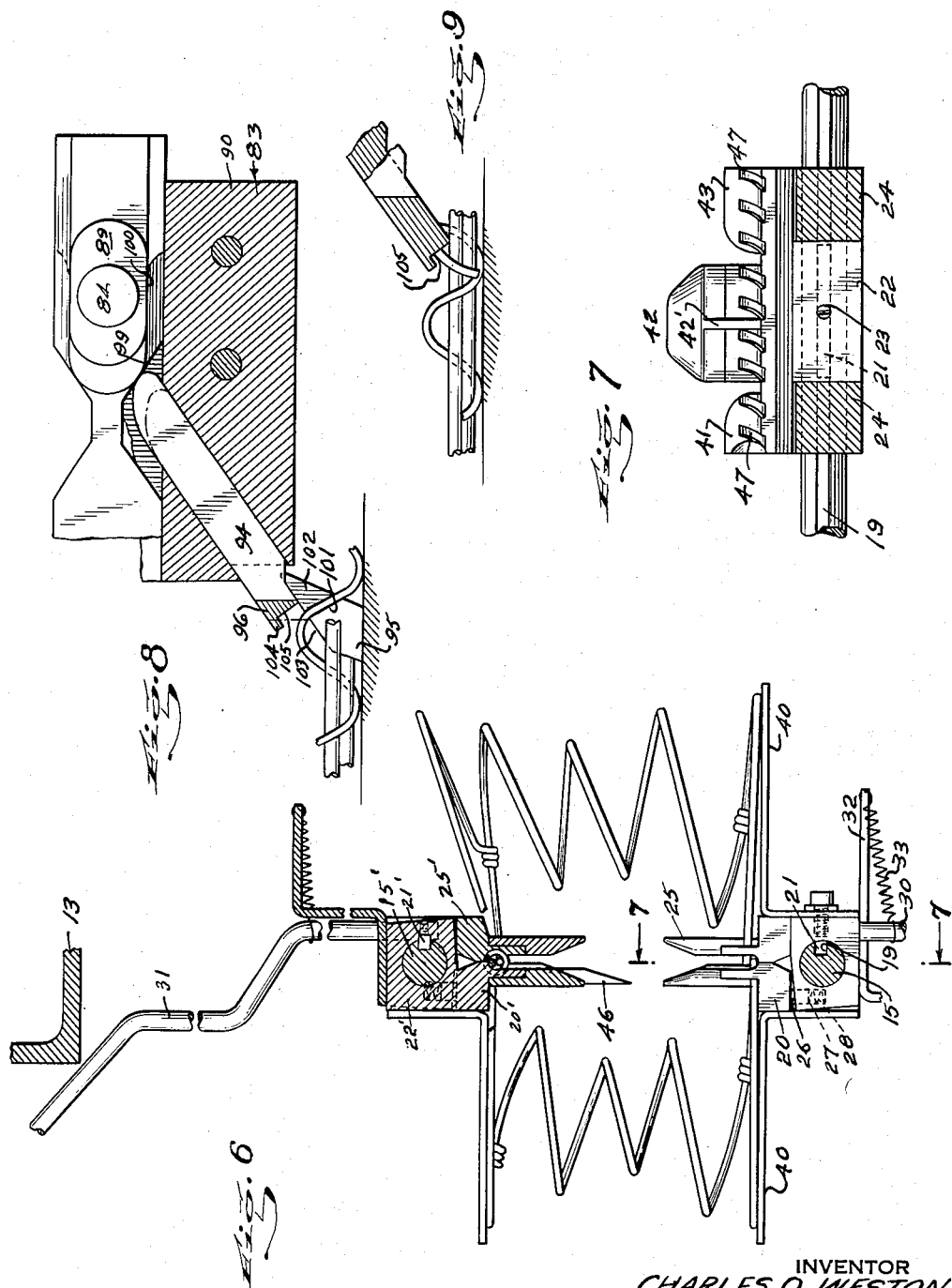
INVENTOR
CHARLES O. WESTON
BY Frederick S. Duncan
ATTORNEY

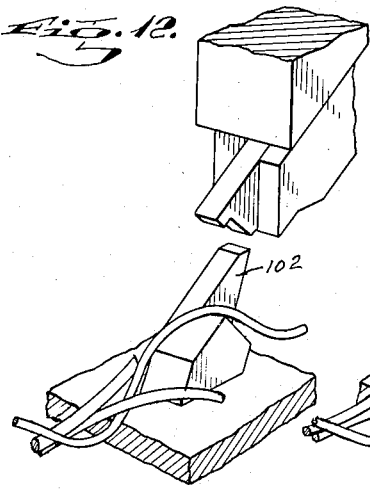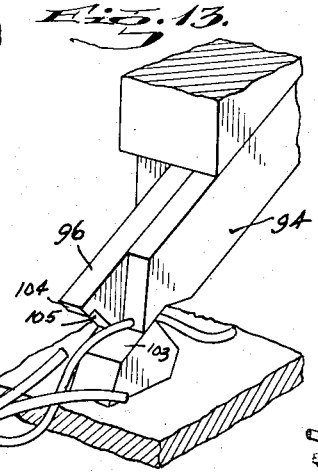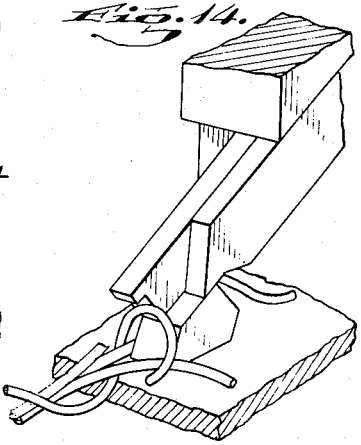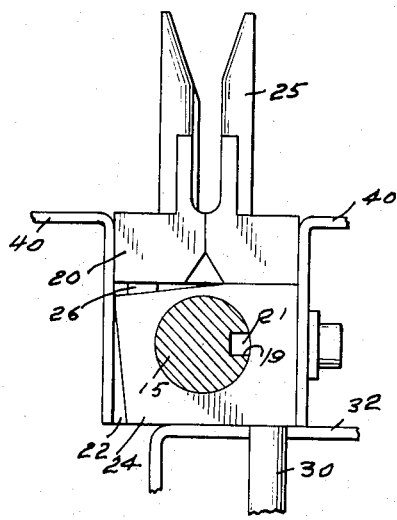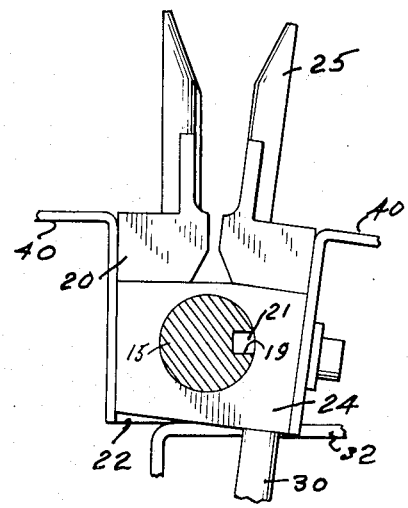

United States Patent Office 2,742,934
Patented Apr. 24, 1956

2,742,934
SPRING ASSEMBLY MACHINES
Charles O. Weston, Bridgeport, Conn.

Application May 10, 1951, Serial No. 225,511

6 Claims. (Cl. 140—92.94)

This invention relates to a machine for spring assemblies for cushions, mattresses and the like, and has particular reference to the machines used for the assembly of the springs into a unitary structure.

A popular type of spring assembly is composed of a number of hourglass cushion springs held in assembled relation by long helical members threaded or screwed around the upper and lower convolutions of the cushion springs. Various machines have been utilized in the past for mounting the helical springs on the cushion springs, but the machines in commercial use at the present time require hand work upon the assembly after the machine has placed the helical springs on the cushion springs. Specifically, the present commercial spring assembly machines require that some cutting and crimping or distortion of the end coil of the helicals be performed, to prevent the helicals from threading off the cushion springs in use. This is done by means of pliers or other hand operated tools, the usual practice being for the workman to cut with one hand and crimp with the other. This is a time-consuming and expensive operation, and because of the nature of the work, it is hard on the workman's hands and consequently an unpleasant task to perform.

It is therefore a primary object of the present invention to provide a spring assembling machine which produces a spring assembly without the necessity of hand operations upon the assembly delivered by the machine.

It is a further object of the present invention to provide a spring assembling machine which will produce a spring assembly with helical connectors fixed in position as the assembly leaves the machine.

Referring now to the drawings:

Figure 1 is a front elevation of a preferred form of machine embodying the present invention;

Figure 2 is an end view of the machine, as seen from the left of Figure 1;

Figure 3 is an enlarged view, with parts broken away and omitted, of the frame structure at the right end of Figure 1;

Figure 4 is a fragmentary sectional view, showing the left side of Figure 3;

Figure 5 is a rear view of the hydraulic mechanism utilized to operate the device;

Figure 6 is an enlarged fragmentary section, taken from the side, of one of the die assemblies utilized in the machine;

Figure 7 is a fragmentary sectional view of part of the lower die, taken on line 7—7 of Figure 6;

Figure 8 is an enlarged, fragmentary sectional front view of part of the cutting and crimping mechanism; in one stage of operation;

Figure 9 is a view similar to Figure 8, with certain parts omitted, of the mechanism in a further stage of operation;

Figure 10 is a view similar to Figure 8, showing other details of the cutting and crimping mechanism;

Figure 11 is a section taken on line 11—11 of Figure 10;

Figs. 12, 13 and 14 show cutters and crimpers in three stages of operation;

Fig. 15 is an enlarged fragmentary view of the bottom portion of Fig. 6; and,

Fig. 16 shows the device of Fig. 15 in another stage of operation.

Briefly, the machine shown in the drawings has upper and lower dies, each of which holds the upper and lower convolutions respectively of two rows of springs. A helical tie spring is threaded into the dies, and is guided by them into proper relation to the convolutions of the cushion springs to hold them together. After the helical tie is in proper position, the machine automatically cuts and crimps the helical tie so it will not unthread in use, and the dies open, at which stage of operation the just-joined cushion springs can be advanced a row, and new springs inserted for joining.

Referring now to the drawings, a frame 10 is provided which serves as a supporting structure for the mechanism. Extending to the rear, the frame supports a platform 11, which is preferably inclined downwardly to the rear, as best seen in Figure 2. This platform supports the completed portion of the spring assembly for the purpose of permitting advance, as each row is added, by the operator simply lifting the completed row and letting the unit slide to the rear. In consequence of the inclined position of the platform, the dies and their supports are all preferably also inclined, which inclination is also visible in Figure 2. A rectangular frame inclined as above mentioned, is defined by two inclined members 12, a top angle member 13, and a lower angle member 14, all rigidly secured in place to each other and to rest of the stationary frame 10.

In order to support the lower row of dies, which lower dies open and shut, but do not move bodily, a shaft 15 is supported in a horizontal position across the inclined frame, passes through and is secured to a block 16 which is in turn connected to the inclined members 12 and to the angle member 14. The support to the shaft 15 may be increased by a block, such as 17, secured to the angle member 14, and through which the shaft passes. Further blocks 18 engaging and secured to the stationary part of one or more of the dies of the lower set and to the angle member 14 may also be employed to support the shaft in position.

The dies just referred to consist essentially of means providing deep slots for rigorously positioning the end coils of the cushion springs, and defining a helical passage through which the helical tie can be passed with a screwing motion. In order that the helical tie be confined to its desired path, it is necessary that the passage through which it passes be closed sufficiently to define an interrupted helical passage with less than half of its periphery missing thereby to hold the tie springs captive. It then, of course, becomes necessary to provide a means for opening the dies to permit the helical tie to be removed transversely of the length of the tie, after the helical tie spring is in place. The dies are all identical generally except that those on the right hand end of the machine are modified by the presence of cutting elements adapted to act upon the helical tie springs, as will be described. In addition, as it is customary to turn the cushion springs all the same way, that is, with the knotted ends all on the same side of the spring axis, with the exception of one spring in each row which is turned around half a revolution, either the extreme left or the extreme right die will be slightly different from the others. For purposes of convenience, it is preferable that the dies at the right of the machine be modified, as they are, as above-mentioned, special in the sense that they carry cutting elements.

Referring to Figures 6 and 7, an end view of one of the lower die pairs is shown in Figure 6, and a section is taken through one of the upper die pairs. For convenience of reference, the right side of Figure 6 is toward the front of the machine, and the left is to the rear. The shaft 15 is provided with a keyway 19, in order to secure one of the die halves against rotation around the axis of the shaft. In the illustrated die set, the rear die half 20 is prevented from rotation by the key 21, which is held in a recess in the portion 22 by means of a set screw 23, which also, by reason of its pressure against the key 21, prevents axial movement of the die half 20 along the shaft.

The forward half 25 of the die set is mounted on the shaft 15 for limited rotative movement, by means of extending lugs 24, one on each side of the portion 22, the portions 22 and 24, together with the die parts to which they are secured being thus related in a manner analogous to the relation of hinge parts. It can thus be seen that the forward die half is pivoted with respect to the rear die half, about the axis of the shaft 15. As shown in Figure 6, the necessary clearances are provided in the portions 24 to permit such movement. A plunger 26 is slidable within a hole 27 drilled in each lug 24, and is pressed by a spring 28 to engage the under surface of the rear die half 20 thus serving to urge the dies in a closing direction.

The upper die assembly is exactly the same in the structure so far described, providing a deep slot to receive the end convolutions of the cushion springs, and detailed description is therefore not necessary. The corresponding parts are marked in the drawings by corresponding, primed numbers. Extending downwardly from the movable forward lower die 25 is a pair of cam members 30, for engagement by a moving member which will be described later to cause the opening of the dies at the proper period in the cycle of operation of the machine. Each pair of dies has identical cam members, and consequently they all open and close together. As can be seen in Figure 6 the upper dies have similar cam members 31, which strike the upper angle 13 at the proper time as the upper dies move upwardly.

In order to further assist the dies in remaining closed when not opened by the cam members 30, members 32 are secured to the portions 22 and form a point of attachment for tension springs 33 which are secured to cam members 30, which springs urge the dies in a closing direction. Similar springs are supplied on the upper dies. The parts of the dies which engage on the cushion springs for proper positioning of the cushion springs are essentially each in the form of two walls facing each other, with cut-out portions in the walls to permit proper positioning of the cushion springs, and also having an indented path forming a channel with a helical groove for the travel of the helical tying spring. As shown in Figures 6 and 7, a platform 40 is provided for each lower die half, upon which the cushion springs rest, and three upstanding portions 41, 42 and 43 on each die half serve, in conjunction with each other, to position the lowermost coils of the cushion springs, the coil of cushion spring passing between the portion 41 and portion 42 and again between portion 42 and portion 43. The edges of the portions 41, 42 and 43 are suitably chamfered to accurately locate the coils, and the centre portion 42 is made higher and with a tapered top to permit rapid placement of the coils. The upper halves to the rear of the machine (on the left as viewed in Figure 6) may be provided with platforms to position the upper spring coils in a plane parallel to the plane occupied by the lower coils, but the front halves of the upper dies are preferably not provided with such platforms. This is because the coil springs are inserted when the upper and lower dies are close enough to each other to require compression of the springs, the insertion being done by hand. Front upper platforms would interfere with the ready insertion of the loose cushion springs. It will be noted that the downwardly extending portion 46 of the upper rear die half is longer than the corresponding portion of the upper front die half, and also is longer than the downwardly extending portions on each side of it. This is for the purpose of assuring easy entrance and positioning of the rear row of coil springs, and also to permit ready snapping in of the forward, loose coil springs. A similar upward extension of the center portion 42 of the rear half of the lower die set can be employed if desired, for a similar purpose.

It will be noted that entry and exit of the cushion springs into the dies is not hindered by the dies whether the dies are open or shut. However, as shown in the section taken through the upper dies in Figure 6, the tying helical cannot leave the channels of the dies radially without them opening, which, as was explained above, was the reason for the opening movement of the dies.

Each die half is provided with a series of grooves 47 which defines part of a helix in each die. The die halves and the grooves 47 are so related that the grooves on one half are continuations of the grooves on the other half. Also, along the length of the shaft connected to the dies, the helices formed in each pair of die halves are in phase with each other. As best shown in Figure 6 the depth of the helical grooves in each die is sufficient to define an interrupted helix in which the amount of thread present amounts to more than half of a complete helix. Thus, once a helical tie is started in the helical groove it cannot leave the groove until the dies are opened. It will also be noted that the grooves are deep enough to completely contain the wire of which the helicals are formed, so that the end coils of the cushion springs will not interfere with the threading-in process of the helical ties. The grooves 47 thus serve not only to guide the helical tie springs into proper interlocking relation with the end convolutions of the cushion springs, but also absolutely prevent the cushion springs from causing stoppage of the threading advance of the helical tie springs, except, of course, in the event that the cushion spring is not inserted far enough into the space provided for it, which event is rendered improbable by the compressed condition of the cushion springs.

In this connection, a rib 42' is supplied on the centre upright member 42 of the rear die half. When the loose springs are inserted in the front dies, because they are not secured together in spaced relation, there would be a possibility of the end convolution resting part way up on the short end walls. This, of course, would produce a faulty joint or else stop the feeding movement of the helical. With the rib 42' present, however, engaging the front spring convolution, the position of the convolution of the front spring is determined by the rib 42' and the sides of the centre wall section of the front die half. The spring is thus free, once it is past the tapered portion of the centre wall, to be urged into complete inward travel into the cavity supplied for it. A similar rib is provided for the upper die half.

In connection with the helical grooves, it is also pointed out that they are really helical, and not, as has been the commercial practice in the past, mere inclined cuts matching, after a fashion, the general appearance of helical grooves. Despite the utmost care in manufacture of the tie springs, variations in the temper of the wire utilized and in the setting of the forming machine result in variation in the pitch of the helical tie springs. The entire helical is more than four feet long, and it can be seen that as the spring assembly requires an exact number of turns to properly engage all the coils and fasten at each end, some means must be provided to assure that the helical tie spring can be stretched or compressed as the helical goes through the machine. Once the helical tie spring is within the grooves, it is readily stretched or compressed the requisite amount, provided the grooves are truly helical and thus offer a wide bearing for the wire of the spring. If approximate helices, or pins, or plates, are used to guide the tie spring, the entire stretching or compressing force is concentrated at a relatively few point contacts between the helical tie spring and the dies, causing rapid wear and consequent inoperativeness after a comparatively short period.

It is to be understood that the stretching or compressing of the helical tie spring is a relatively small amount per turn, as the total change in length for the whole spring need be no more than say a quarter of an inch from the set length of the spring. Also, as each die is movable, upon release of screw 23, the successive dies are readily set so that the helical tie spring leaving one die readily enters the next successive die.

The mechanism so far described comprises a set of upper and lower dies, the dies being openable to release the assembled springs, and the upper set of dies being movable in an upward and downward direction. At this point a brief description of the operative cycle of the machine is set forth. With the upper dies in a downward position, and their support locked in place, so they can move in neither direction, the operator inserts cushion springs by compressing them and permitting them to expand with their end coils in proper position. He then inserts a length of helical tie spring for the top convolutions, and another for the bottom convolutions. The machine automatically advances each of the helical tie springs, to its proper position, and, when both have reached such position the machine automatically and in response to such positioning, crimps one end of each helical tie spring, and cuts and crimps near the other end. The upper dies then rise, and both upper and lower dies open. The assembled coils can then be moved to the rear of the machine, and the upper dies are lowered by the operator pushing a button. The cycle is then repeated.

The motion of the upper dies, the opening and closing of both sets of dies, and the cutting and crimping are all performed by the motion of a hydraulic mechanism. As shown in Figure 5, a rotary pump 50, driven by a suitable motor 51, is mounted on a tank 52. This pump delivers oil to a line 53 under pressure. An electrically operated valve 54 is provided which directs the flow of oil from the pipe 53 to two pipes 55 and 56, connected to opposite ends of a hydraulic cylinder 57. It will be understood, of course, that oil from one end of the cylinder is driven back through line 55 while the piston in the cylinder is moving under the influence of oil delivered to the cylinder by line 56 and is delivered by the line 58 to the tank. The opposite is the case when the piston is being driven in the opposite direction. Suitable electrical valve operating switches 60 are provided, as shown; the switch operating parts of the machine will be described later.

The hydraulic piston rod 59 is connected to a crank 49 on the shaft 61, and rotation of the shaft 61 is utilized to cause movement of the parts of the machine as desired. Referring to Figures 2 and 4, the shaft 61 is shown as suitably journalled on the machine frame. A crank 62 is provided at each end of the machine frame, which cranks are connected by links 63 to blocks 64. Upward and downward movement of these blocks is the means by which the machine is driven through its cycle.

The blocks 64 are interconnected by means of a channel 65 which extends the entire width of the machine under the guard 66. The blocks 64 and the channel 65 are rigidly secured to the inclined members 67.

In addition to moving the members 67, the blocks 64 also move a pair of rods 70, which lifts the entire row of upper dies and incidentally opens them at the proper moment in the cycle. Each rod 70 slidably passes through block 16, which is fixed to the frame, and is secured to and passes through a block 71 essentially similar to block 16, which block 71 is not, however, secured to the machine frame. The blocks 71 are secured to an angle 72 extending the width of the machine, so that the blocks 71, the angle 72 and the upper die assembly are free to move in a path parallel to the axis of the rod. The upper end of each rod is guided in a block 73 which is secured to the frame members 12 and 13. Motion of the rods 70 is obtained from an abutment 74 secured to the rod, and engaged by the block 64 upon sufficient upward movement. An angle 75 is secured to each abutment 74 thus effectively aligning the abutments.

At this point, it is pointed out that in Figure 1 three inclined members are visible which are essentially the same as what has thus far been described. The intermediate one is in all respects the same as the two end members, but is movable widthwise of the machine for the purpose of allowing different sized spring units to be made. It is to be understood that variation in the size of the spring units is achieved by adding or removing complete dies and then moving the intermediate member to the proper position. It should also be understood that the cranks 62 and the links 63 are not present on the intermediate member, which then, of course, takes its motion from the channel 64.

It was pointed out before that the upper dies are locked in a downward position, at which time the operator inserts the cushion springs and the helical tie springs. In order to so lock the upper dies, means is provided to lock the blocks 71, supporting the shaft 15', against the blocks 16, which are rigid on the machine frame. This is done by means of a swinging bar 76 pivoted at 77 to the block 71. When the blocks 16 and 71 are in contact, a notch 78 (best seen in Figure 2), engages the bottom of the block 16 and prevents the block 71 from moving upwardly. The bar 76 is urged into locking position by spring pressed plungers 79 within the strap 80 straddling the bar 76 and secured to the block 16.

In order to unlock the upper blocks 71 from the lower blocks 16, the motion of bars 67 is utilized. A beveled abutment 81 is secured to the bar 67, and engages the inclined surface 82 on the surface of the swinging lock bar 76 at the proper moment in the upward movement of the bar 67. This lock mechanism is preferably present on the intermediate as well as the end inclined members, as shown in Figure 1. An important function which is performed by the movement of the bars 67 before the upper blocks 71 are unlocked from the lower blocks 16 is the cutting and crimping of the helical tie springs. In the particular machine illustrated, the tie helical springs are fed to the machine in lengths slightly longer than required, and are then cut to exact lengths, and crimped around the wire of the end cushion springs.

For the purpose of cutting and crimping the helical tie on the right side of the machine, the mechanism illustrated particularly in Figures 8 to 11, is operated by parts illustrated in Figure 3. Secured to the block 16 is a cutter casing 83, from the front face of which protrudes a pin 84, which is mounted for sideways movement. The movement of pin 84 is the result of the movement of bar 67 relative to the frame of the machine as it is driven by the crank 62. The slot 85 in the bar 67 because of its sinuous configuration causes the pin 84 to move from its normal position toward the left, and later move toward the right. Referring now to Figures 8 to 11, the pin 84 projects through a slot 86 in the front cover 87 of the cutter case, and is secured to or integral with a cam slide 88. For the purpose of securing rigidity, the cover is grooved to slidingly receive the projection 89 on the cam slide 88. The body 90 of the cutter casing 83 has a groove 91 along which the cam slide 88 is slidingly movable and also has a pair of oblique grooves 92 and 93 in which the cutters and crimpers move.

The top and bottom cutters and crimpers are identical, in the shown form. In the case of the bottom set, the member 94 is the cutter, and cooperates with a stationary member 95 on the lower die assembly to shear the wire.

The crimper is a somewhat similar piece 96, which has a differently shaped working end. As shown in Figure 10, each cutter and crimper has a slot as 96', and a spring 97 bearing against an abutment 98 fixed to the casing and against the ends of the slots 96', to urge the cutters and crimpers in a retracted direction. These springs have been omitted from the showing in Figure 9 for purposes of simplicity and to prevent confusion.

The cam slide 88 is cut away on the top and bottom to permit the springs to retract the cutters and crimpers. The inclined portion 99 is, in the case of the bottom set of cutter and crimper, continued at the rear to the straight side of the slide. At the front, the inclined surface 99 continues only to the horizontal surface 100, formed by cutting away the cam slide. Because of the cut away portion the cutter 94 advances only as far as the dot and dash lines in Figure 8 indicate, during the operating movement of the cam slide. The crimper 96, on the other hand, continues its forward movement until its inner end is flush with the groove in the cutter casing. Thus the cutter and crimper move together, at the first part of the operating stroke, and the cutter then stops, and the crimper continues further.

In Figure 8, the relation of the movable cutter 94 and the stationary member 95 is shown. The stationary member 95 has an inclined surface 101 in a position to permit the threaded-in helical to enter without hindrance, the helical tie passing in front of the wall 102 and near or on the inclined surface 101. The movable cutter 94 has a nose which slides on the top surface 103, and thus is in shearing relation with the stationary cutter member. As shown by the dot and dash lines, the nose of the cutter 94 moves just far enough to shear the wire.

The action of the crimper is best shown in Figure 10. As the cutter and crimper are actuated by a common cam surface 99 until the wire is severed, the crimper and cutter move together from the position shown in solid lines in Figure 9 until the wire is severed. The crimper does not engage the wire until just after severance of the wire. At this time, it continues forward, and the wire is caught under the projection 104 and urged onward by the wall 105. Because of the helical configuration of the wire, the distortion, as shown in Figure 9, is essentially a twisting of the last half turn of the helix, which effectively prevents unthreading of the helix from the assembly. Of course, it is to be understood that almost any distortion from helical configuration, as, for example, a flattening of the turn, will be effective, and the distortion shown is selected as convenient and involving no coining contact which would put a strain on the crimper parts.

As shown in Figure 10, the upper set of cutter and crimper is exactly the same as the lower set. They are turned around so that the crimper is in the front and the cutter to the rear, so the shape of the cutter and crimper for both top and bottom set is the same, rather than requiring lefts and rights. Because of this, the surface 106, corresponding to the surface 100, is to the rear, rather than to the front, as shown in Figures 10 and 11.

The intermediate inclined assembly 107, previously described, has, as can be seen, a slot 108 for operating a device exactly the same as the cutter and crimper assembly described above, except for the fact that the cutters are omitted. No detailed showing of this feature is believed necessary.

Referring to Figs. 3 and 4, the relationship between the parts just described is such that initial upward movement of the block 64 first operates the cutters by sideways movement of the pin 84, as the bar 67 moves upwardly. The bevelled abutment 81 then unlocks the upper block by striking the portion 82 of the latch. Subsequently, the block 64 strikes the block 74, and, upon further upward movement of block 64, the rods 70 rise. As blocks 71 are secured to these rods, the upper dies rise.

In order to feed the helical tie wires into the dies in correct relation to the dies and the cushion springs, a device indicated to the right in Figure 1 is employed. This device for feeding each helical tie consists essentially of a guide tube 108 into which lengths of helical tie springs are inserted. Three rollers are grouped so as to engage a spring emerging from the tube 108 around its periphery. Two of these rollers for each set 109 and 110 are visible in the figure. One or more of the rollers is provided with a series of circumferential grooves indicated on 109. These grooves are sufficiently wide to permit the lands between the grooves to enter the spaces between the convolutions of the helical tie springs. A suitable drive for rotating the rollers rotates the helices and, because of the engagement of the lands with the convolutions, feeds the helices forward. As the engagement between the helical ties and the rollers is frictional, if for any reason the tie wire should strike an obstruction in its forward progress, the tie will stop rotating and can be cleared and sent forward again.

In order to permit the rollers to be spread apart slightly, a pedal 111 is supplied, which upon being depressed, lowers the roller 110 of each set. This, of course, can be done when inserting the spring lengths, and also in clearing any jam which may stop the forward advance of the tie spring. Also, as was before pointed out, it is sometimes necessary to allow for the helical tie wire having a slightly different pitch. This is done by mounting the entire feeding assembly for slight adjustment axially of the rollers, the adjustment bringing the end of the entering spring to the first die in the proper position to enter the helical groove therein.

As the upward movement of the element 64, caused by operation of the hydraulic mechanism causes, in succession, unlocking of the upper dies, cutting and crimping of both upper and lower helical tie springs, and finally, raising of the upper dies, it is obvious that such upward movement of the element 64 should not take place until both helical tie wires are in position for cutting and crimping.

As the operator makes no effort to insert the lengths at the same time, the fact that the feeding mechanism advances the tie springs until they strike an obstruction is taken advantage of, by providing an abutment for the ties to come into contact with, and also a mechanism for starting the mechanism after the arrival of the second helical tie.

The case 112, containing the crimping members for operation at the intermediate bar assembly 107, has a pair of rods 113 passing through it. These rods are so positioned that their ends act as abutments for the helical tie springs emerging from the last die sets, and stop their forward movement. The rods 113 are connected to the switches 60, and, upon engagement by the helical tie springs, serve to close the switches 60. These switches are in effect in series, and after the second one is closed, the valve 54 is actuated, to admit fluid to the piston and start the crank arm 62 upward. It will be noted that the abutments provided by the end of the rods are closely adjacent to the path of movement of the crimpers, and the abutments thus accurately locate the ends of the helical tie springs for engagement by the crimpers, which work as the crimpers on the right end of the machine to deform the end turn of the helical tie spring.

After the length of material inserted in the machine has been cut, it is necessary to discharge the scrap end from the feeder mechanism. The method of ejecting the scrap employed in the shown machine is simple reversal of the rollers 109 and 110. A suitable reversing motor is employed to drive the feeding rollers, and a switch 120 is attached to the block 77. The wheel 121 of the switch, upon being engaged by the bar 67, reverses the motor driving the feeding mechanism and ejects the scrap, which thus falls into the chute 123.

The above described machine will work, but in order to relieve strain on the hydraulic mechanism, a pair of counter-weights 125 is supplied, with cables passing over pulleys 126, and secured to the blocks 71. In order to assure that the moving set of blocks 71, and all the attached dies follow the bars 67 downward, a pin 127 is secured to the block 71, and extends through an elongated slot 128 in the bar 67. This slot permits upward movement of the bar 67 with reference to the block 71 until the block 64 engages block 74, but upon downward driving of the bar 67 by the cranks 62, the block 71 is positively driven down by pressure of the top edge of the slot 128 on the pin 127.

The operation of the device should now be clear, when it is stated that a button 130 will start the movable upper dies down by operating the valve 54 as do switches 60, except that it causes the valve to deliver fluid to the opposite end of the hydraulic piston from the end to which fluid is admitted by the switches 60. Starting with the parts in the position shown in Figure 4, that is, with the upper dies lowered, and the die pairs closed, the operator snaps cushion springs in place by hooking the lower coils over the centre portions 42 of the lower dies, and compressing the springs sufficiently to hook the upper coil around the corresponding centre portion of the upper dies. After the cushion springs are in place, the operator takes two lengths of helical tie spring and inserts them into the two tubes 108. They are threaded by the feed mechanism into the grooves 47 in the dies, until they engage the ends of the rods 113, which stops the feeding motion because of slippage of the rolelrs 109 and 110, although the rollers continue to turn. As soon as the second helical tie reaches its corresponding rod, the valve 54 operates to reverse pressure in lines 55 and 56, and crank 62 starts to rise. The first motion of the crank operates the cutters and crimpers, by reason of the cam slot in the bar 67 passing the pin 84. Continuing motion of the bar 67 unlocks the latch 76, and the upper set of dies is freed to move upwardly. The wheel 121 is engaged by the side of the bar 67, and the rollers reverse driving the scrap out of the mechanism. Blocks 64 come into contact with blocks 74, and the upper set of dies starts to rise. The cam members 31 secured to the movable part of the upper die, engage the angle 13, and open the dies, disengaging the helical from the dies. Subsequently, the lower cam members 30 are engaged by the angle 75, and the lower dies open. The assembly of upper dies comes to rest with the angle 72 resting against the blocks 73. The operator then grasps the now-linked springs, and lifts them bodily from engagement with the lower dies, and moves the assembly back so that the forward parts of the convolutions of the just-linked springs are engaged by the bottom dies. He then pushes the button 130, which starts the upper die assembly down. The centre portions of the downwardly extending positions of the die walls engage the top convolutions of the springs in the proper place, and the dies continue downward until the blocks 71 engage the blocks 16, and the bars 76 lock the assembly. The machine is then in position for the insertion of a new row of loose cushion springs, and the cycle is repeated.

It is to be understood that considerable structural variation is possible, and that the above description is intended to be illustrative rather than limitative, and that the scope of the invention is to be apprehended from the appended claims.

I claim:

1. In a machine for making spring assemblies of the type having helical tie springs engaging the end convolutions of adjacent cushion springs, means supporting a pair of helical tie springs in parallel, spaced relation, a paired cutting element and separately movable crimping element in parallel relation for severing and crimping one of said springs, a similar paired cutting element and crimping element in parallel relation for severing and crimping the other of said springs, said pairs of elements being divergently advanceable from a region between the axes of the supported helical tie springs, and a common cam element for advancing said elements toward their respective springs, said cam element driving the crimping elements during and subsequent to driving of the cutting elements under the influence of said cam element.

2. In a machine for making spring assemblies of the type having helical tie springs engaging the end convolutions of adjacent cushion springs, a pair of widely-separated die means for engaging and positioning corresponding end convolutions of a pair of cushion springs, means guiding a preformed and precut helical tie spring in threading advance into assembled, interlocking engagement with said end convolutions of the cushion springs, a slippable, friction drive for turning and advancing said tie spring, movable abutment means limiting the advance of the tie spring to a point where its forward end is closely adjacent the region of mutual engagement of the tie spring and the end convolution of one of the cushion springs, a crimp member movable to engage the tie spring near its forward end and upon continued movement distort the tie spring, a cutter member for severing the tie spring near its rear end and closely adjacent the region of engagement with the end convolution of the other cushion spring, a second crimp member adjacent the cutter member, for distorting the remaining cut end of the tie spring, and means operated in response to movement of said abutment member, moving said cutter member to shear the tie spring and moving said crimp members to crimp the ends of the tie spring, said means providing for the second crimp member moving simultaneously with and independently of the cutter member and continuing its movement after shearing of the spring and halting of the cutter member.

3. In a machine for making spring assemblies of the type having helical tie springs engaging the end convolutions of adjacent cushion springs, a frame, a fixed support, fixed to said frame and carrying a first series of dies disposed in a row for engaging and positioning the end convolutions of a row of cushion springs, a movable support, mounted for movement relative to said frame and carrying a second series of dies disposed in a row opposite to the first series of dies, for engaging and positioning the opposite end convolutions of the row of cushion springs, means retaining the movable support and its dies in a position to compress cushion springs disposed between the oppositely-disposed dies, means including powered drivers, threadingly advancing and guiding a preformed and precut helical tie spring through said dies and into interlocking engagement with each row of die-engaged cushion spring convolutions, crimper mechanisms disposed adjacent one pair of corresponding ends of the series of dies, operable on the leading end of each helical tie spring, cutter and crimper mechanisms disposed between the rows of cushion springs and the said powered drivers, a power driven member operative upon movement to actuate said crimper and cutter and crimper mechanisms and to move the movable support and its dies away from the fixed support and its dies, a pair of actuatable abutment means, each engageable by the leading end of a different advancing tie spring, and means responsive to actuation of said abutment means by the leading ends of the tie springs, initiating movement of said power-driven member only after both of said abutment means are actuated.

4. In a machine for making spring assemblies of the type having helical tie springs engaging the end convolutions of adjacent cushion springs, a frame; a series of dies disposed in a row on the frame, for engaging and positioning one set of end convolutions of a row of cushion springs; means on said frame for engaging and positioning the other set of end convolutions of the row of cushion springs; means for threadingly advancing and guiding a preformed and precut helical tie spring through said dies and into interlocking engagement with the die-engaging cushion spring convolutions, said dies each having relatively movable sections formed to provide between them a channel for the tie spring, said dies being openable by separating movement of the sections thereof and each die having a cavity for receiving and seating portions of the end convolutions of the cushion springs, said cavities being at all times accessible and in the view of the operator, and said die sections being shaped and arranged so that the said cavities are open for reception of said spring portions when the dies are in fully closed condition with the sections thereof disposed closest to each other, each die section having helically-disposed grooves forming in the channel of the die when the latter is in closed condition a helical path for the threading advance of the tie spring into assembled relation with the seated end convolutions of the cushion springs, the walls of said grooves being of sufficient extent circumferentially of the axis of the helix when the die is in closed condition to prevent transverse removing movement of the helical tie spring from the die, said die sections being pivoted on each other; resilient means for individually holding the sections of each die disposed closest to each other; and manually operable means for enabling the sections of each die to be separated against the action of said spring means whereby the die may be individually opened at the will of the operator for adjustment purposes.

5. In a machine for making spring assemblies of the type having helical tie springs engaging the end convolutions of adjacent cushion springs, a pair of widely-separated die means for engaging and positioning corresponding end convolutions of a pair of cushion springs, means guiding a preformed and precut helical tie spring in threading advance into assembled, interlocking engagement with said end convolutions of the cushion springs, a slippable, friction drive for turning and advancing said tie spring, movable abutment means limiting the advance of the tie spring to a point where its forward end is closely adjacent the region of mutual engagement of the tie spring and the end convolution of one of the cushion springs, a crimp member movable to engage the tie spring near its forward end and upon continued movement distort the tie spring, a cutter member for severing the tie spring near its rear end and closely adjacent the region of engagement with the end convolution of the other cushion spring, and means operated in response to movement of said abutment member, moving said cutter member to shear the tie spring and moving said crimp member to crimp the end of the tie spring, said slippable friction drive slipping when the forward end of the tie spring is halted by the abutment means and maintaining said forward end in continual engagement with the abutment means prior to the crimping of said end.

6. The invention as defined in claim 3 in which the dies comprise pairs of movable sections pivoted on each other, in which there are manually operable means for enabling the sections of the individual dies to be opened independently of the other dies and at the will of the operator for adjustment purposes.

References Cited in the file of this patent
UNITED STATES PATENTS

| | | |
|---|---|---|
| 1,905,459 | Gail | Apr. 25, 1933 |
| 1,922,002 | Karr | Aug. 8, 1933 |
| 1,930,715 | Heuer | Oct. 17, 1933 |
| 2,026,276 | Erickson | Dec. 31, 1935 |
| 2,161,689 | Strandberg | June 6, 1939 |
| 2,176,262 | Kirchner | Oct. 17, 1939 |
| 2,262,994 | Dickey | Nov. 18, 1941 |
| 2,282,664 | Marcus | May 12, 1942 |
| 2,294,707 | Zimmerman | Sept. 1, 1942 |
| 2,296,878 | Saval | Sept. 29, 1942 |
| 2,388,106 | Woller | Oct. 30, 1945 |
| 2,414,372 | Frankel | Jan. 14, 1947 |
| 2,470,812 | Gauci | May 24, 1949 |
| 2,625,962 | Bronstien | Jan. 20, 1953 |
| 2,663,038 | Gail | Dec. 22, 1953 |